US007545380B1

(12) United States Patent
Diard et al.

(10) Patent No.: US 7,545,380 B1
(45) **Date of Patent: *Jun. 9, 2009**

(54) SEQUENCING OF DISPLAYED IMAGES FOR ALTERNATE FRAME RENDERING IN A MULTI-PROCESSOR GRAPHICS SYSTEM

(75) Inventors: Franck R. Diard, Mountain View, CA (US); Wayne Douglas Young, Milpitas, CA (US); Philip Browning Johnson, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/015,593

(22) Filed: Dec. 16, 2004

(51) Int. Cl.

| | |
|---|---|
| ***G06F 11/20*** | (2006.01) |
| ***G06F 15/80*** | (2006.01) |
| ***G09G 5/37*** | (2006.01) |

(52) U.S. Cl. ........................ 345/505; 345/440; 345/562

(58) Field of Classification Search ................. 345/501, 345/502, 503, 504, 505, 506, 440, 538, 539, 345/562, 153; 711/100, 147, 148, 150, 152, 711/154, 167; 395/830

See application file for complete search history.

(56) References Cited

U.S. PATENT DOCUMENTS

| | | | | |
|---|---|---|---|---|
| 5,742,812 | A * | 4/1998 | Baylor et al. .................. | 707/8 |
| 5,790,130 | A | 8/1998 | Gannett | |
| 5,799,204 | A * | 8/1998 | Pesto, Jr. ...................... | 710/10 |
| 5,841,444 | A | 11/1998 | Mun et al. | |
| 5,889,531 | A * | 3/1999 | Koike et al. ................. | 345/441 |
| 6,023,281 | A | 2/2000 | Grigor et al. | |
| 6,078,339 | A | 6/2000 | Meinerth et al. | |
| 6,157,395 | A * | 12/2000 | Alcorn ....................... | 345/506 |
| 6,191,800 | B1 | 2/2001 | Arenburg et al. | |

(Continued)

FOREIGN PATENT DOCUMENTS

| | | |
|---|---|---|
| EP | 0571969 | 5/2003 |

OTHER PUBLICATIONS

Computer Graphics, 26,Jul. 2, 1992 "PixelFlow: High-Speed Rendering using Image Composition", by Steven Molnar et al. pp. 231-240.

(Continued)

*Primary Examiner*—Xiao M Wu
*Assistant Examiner*—Aaron M Guertin
(74) *Attorney, Agent, or Firm*—Townsend and Townsend and Crew LLP

(57) ABSTRACT

Method, apparatuses, and systems are presented for processing an ordered sequence of images for display using a display device, involving operating a plurality of graphics devices, including at least one first graphics device that processes certain ones of the ordered sequence of images, including a first image, and at least one second graphics device that processes certain other ones of the ordered sequence of images, including a second image, the first image preceding the second image in the ordered sequence, delaying at least one operation of the at least one second graphics device to allow processing by the at least one first graphics device to advance relative to processing by the at least one second graphics device, in order to maintain sequentially correct output of the ordered sequence of images, and selectively providing output from the graphics devices to the display device.

21 Claims, 10 Drawing Sheets

U.S. PATENT DOCUMENTS

| | | | | |
|---|---|---|---|---|
| 6,226,717 | B1 * | 5/2001 | Reuter et al. | 711/147 |
| 6,259,461 | B1 | 7/2001 | Brown | |
| 6,266,072 | B1 | 7/2001 | Koga et al. | |
| 6,317,133 | B1 | 11/2001 | Root et al. | |
| 6,362,818 | B1 | 3/2002 | Gardiner et al. | |
| 6,445,391 | B1 | 9/2002 | Sowizral et al. | |
| 6,469,745 | B1 | 10/2002 | Maida | |
| 6,473,086 | B1 | 10/2002 | Morein et al. | |
| 6,570,571 | B1 | 5/2003 | Morozumi | |
| 6,724,390 | B1 | 4/2004 | Dragony et al. | |
| 6,747,654 | B1 * | 6/2004 | Laksono et al. | 345/502 |
| 6,781,590 | B2 | 8/2004 | Katsura et al. | |
| 6,900,813 | B1 * | 5/2005 | Stefanidis | 345/562 |
| 6,965,933 | B2 * | 11/2005 | Haartsen | 709/223 |
| 2002/0130870 | A1 * | 9/2002 | Ebihara | 345/440 |
| 2003/0128216 | A1 | 7/2003 | Walls et al. | |
| 2004/0075623 | A1 | 4/2004 | Hartman | |
| 2005/0012749 | A1 | 1/2005 | Gonzalez | |
| 2005/0088445 | A1 | 4/2005 | Gonzalez | |

OTHER PUBLICATIONS

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

* cited by examiner

```
GPUState[2] = { ACTIVE, INACTIVE};
FrameNumber[2]= {0, 0};
Semaphore.Init(0);

flip(GPU i)
{
  if (GPUState[i]==ACTIVE)
  {
    Semaphore.Acquire(FrameNumber[i]);
    GPU(i).Display(NewBuffer);
    GPUState[i]=INACTIVE;
  }
  else
  {
    Semaphore.Release(FrameNumber[i]);
    GPUState[i]=ACTIVE;
  }
  FrameNumber[i]++;
}
```

FIG. 8

```
Semaphore=0;
SemaphoreAcquiringValue[2] = { -1, -1 };
SemaphoreAcquiring[2] = { FALSE, FALSE };
Unstall[2] = { FALSE, FALSE };

flip(GPU i)
{
 FrameNumber[i]++;

 if (GPUState[i]=ACTIVE)        //acquire
 {
  if (FrameNumber[i]==pMultichipVideoSplit->AFRSemaphore)
  {
   Unstall[i]=TRUE
   SemaphoreAcquiring[i]=FALSE;
   GPU(i).Display(NewBuffer);
  }
  else
  {
   SemaphoreAcquiring[i]=TRUE;
   SemaphoreAcquiringValue[i] = FrameNumber[i];
  }

  GPUState[i]=INACTIVE;
 }
 else       //release
 {
  Semaphore=FrameNumber[i];

  if (SemaphoreAcquiring[1-i]==TRUE && (SemaphoreAcquiringValue[1-i] ==
Semaphore))
  {
   SemaphoreAcquiring[1-i] = FALSE;
   GPU(1-i).Display(NewBuffer);
   Unstall[1-i]=TRUE
  }

  Unstall[i]=TRUE
  GPUState[i]=ACTIVE;
 }

 for (i=0; i<2; i++)
 {
  if (Unstall[i]==TRUE)
  {
   "release the SYNCSTALL method of GPU 0";
    Unstall[i]=FALSE;
  }
 }
}
```

FIG. 9

SEQUENCING OF DISPLAYED IMAGES FOR ALTERNATE FRAME RENDERING IN A MULTI-PROCESSOR GRAPHICS SYSTEM

CROSS-REFERENCES TO RELATED APPLICATIONS

The present application is being filed concurrently with the following related U.S. patent application, which is assigned to NVIDIA Corporation, the assignee of the present invention, and the disclosure of which is hereby incorporated by reference for all purposes:

U.S. patent application Ser. No. 11/015,600, entitled "COHERENCE OF DISPLAYED IMAGES FOR SPLIT FRAME RENDERING IN A MULTI-PROCESSOR GRAPHICS SYSTEM".

The present application is related to the following U.S. patent applications, which are assigned to NVIDIA Corporation, the assignee of the present invention, and the disclosures of which are hereby incorporated by reference for all purposes:

U.S. application Ser. No. 10/990,712, filed Nov. 17, 2004, entitled "CONNECTING GRAPHICS ADAPTERS FOR SCALABLE PERFORMANCE".

U.S. patent application Ser. No. 11/012,394, filed Dec. 15, 2004, entitled "BROADCAST APERTURE REMAPPING FOR MULTIPLE GRAPHICS ADAPTERS".

U.S. patent application Ser. No. 10/642,905, filed Aug. 18, 2003, entitled "ADAPTIVE LOAD BALANCING IN A MULTI-PROCESSOR GRAPHICS PROCESSING SYSTEM".

BACKGROUND OF THE INVENTION

The demand for ever higher performance in computer graphics has lead to the continued development of more and more powerful graphics processing subsystems and graphics processing units (GPUs). However, it may be desirable to achieve performance increases by modifying and/or otherwise utilizing existing graphics subsystems and GPUs. For example, it may be more cost effective to obtain performance increases by utilizing existing equipment, instead of developing new equipment. As another example, development time associated with obtaining performance increases by utilizing existing equipment may be significantly less, as compared to designing and building new equipment. Moreover, techniques for increasing performance utilizing existing equipment may be applied to newer, more powerful graphics equipment when it become available, to achieve further increases in performance.

On approach for obtaining performance gains by modifying or otherwise utilizing existing graphics equipment relates to the use of multiple GPUs to distribute the processing of images that would otherwise be processed using a single GPU. While the use of multiple GPUs to distribute processing load and thereby increase overall performance is a theoretically appealing approach, a wide variety of challenges must be overcome in order to effectively implement such a system. To better illustrate the context of the present invention, description of a typical computer system employing a graphics processing subsystem and a GPU is provided below.

FIG. 1 is a block diagram of a computer system 100 that includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering module 120, a memory interface module 122, and a scanout module 124. Rendering module 120 may be configured to perform various tasks related to generating pixel data from graphics data supplied via system bus 106 (e.g., implementing various 2-D and or 3-D rendering algorithms), interacting with graphics memory 116 to store and update pixel data, and the like. Rendering module 120 is advantageously configured to generate pixel data from 2-D or 3-D scene data provided by various programs executing on CPU 102. Operation of rendering module 120 is described further below.

Memory interface module 122, which communicates with rendering module 120 and scanout control logic 124, manages interactions with graphics memory 116. Memory interface module 122 may also include pathways for writing pixel data received from system bus 106 to graphics memory 116 without processing by rendering module 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126 and a command buffer 128. Pixel buffer 126 stores pixel data for an image (or for a part of an image) that is read and processed by scanout module 124 and transmitted to display device 110 for display. This pixel data may be generated, e.g., from 2-D or 3-D scene data provided to rendering module 120 of GPU 114 via system bus 106 or generated by various processes executing on CPU 102 and provided to pixel buffer 126 via system bus 106. In some implementations, pixel buffer 126 can be double buffered so that while data for a first image is being read for display from a "front" buffer, data for a second image can be written to a "back" buffer without affecting the currently displayed image. Command buffer 128 is used to queue commands received via system bus 106 for execution by rendering module 120 and/or scanout module 124, as described below. Other portions of graphics memory 116 may be used to store data required by GPU 114 (such as texture data, color lookup tables, etc.), executable program code for GPU 114 and so on.

Scanout module 124, which may be integrated in a single chip with GPU 114 or implemented in a separate chip, reads pixel color data from pixel buffer 118 and transfers the data to display device 110 to be displayed. In one implementation, scanout module 124 operates isochronously, scanning out frames of pixel data at a prescribed refresh rate (e.g., 80 Hz) regardless of any other activity that may be occurring in GPU 114 or elsewhere in system 100. Thus, the same pixel data corresponding to a particular image may be repeatedly scanned out at the prescribed refresh rate. The refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). Operation of scanout module 124 is described further below.

During operation of system 100, CPU 102 executes various programs that are (temporarily) resident in system memory 104. These programs may include one or more operating system (OS) programs 132, one or more application programs 134, and one or more driver programs 136 for graphics processing subsystem 112. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 128, and/or in other storage space.

Operating system programs 132 and/or application programs 134 may be of conventional design. An application program 134 may be, for instance, a video game program that generates graphics data and invokes appropriate rendering functions of GPU 114 (e.g., rendering module 120) to transform the graphics data to pixel data. Another application program 134 may generate pixel data and provide the pixel data to graphics processing subsystem 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 enables communication with graphics processing subsystem 112, including both rendering module 120 and scanout module 124. Driver program 136 advantageously implements one or more standard application program interfaces (APIs), such as Open GL, Microsoft DirectX, or D3D for communication with graphics processing subsystem 112; any number or combination of APIs may be supported, and in some implementations, separate driver programs 136 are provided to implement different APIs. By invoking appropriate API function calls, operating system programs 132 and/or application programs 134 are able to instruct driver program 136 to transfer geometry data or pixel data to graphics card 112 via system bus 106, to control operations of rendering module 120, to modify state parameters for scanout module 124 and so on. The specific commands and/or data transmitted to graphics card 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

In some implementations, command buffer 128 queues the commands received via system bus 106 for execution by GPU 114. More specifically, driver program 136 may write one or more command streams to command buffer 128. A command stream may include rendering commands, data, and/or state commands, directed to rendering module 120 and/or scanout module 124. In some implementations, command buffer 128 may include logically or physically separate sections for commands directed to rendering module 120 and commands directed to display pipeline 124; in other implementations, the commands may be intermixed in command buffer 128 and directed to the appropriate pipeline by suitable control circuitry within GPU 114.

Command buffer 128 (or each section thereof) is advantageously implemented as a first in, first out buffer (FIFO) that is written by CPU 102 and read by GPU 114. Reading and writing can occur asynchronously. In one implementation, CPU 102 periodically writes new commands and data to command buffer 128 at a location determined by a "put" pointer, which CPU 102 increments after each write. Asynchronously, GPU 114 may continuously read and process commands and data sets previously stored in command buffer 128. GPU 114 maintains a "get" pointer to identify the read location in command buffer 128, and the get pointer is incremented after each read. Provided that CPU 102 stays sufficiently far ahead of GPU 114, GPU 114 is able to render images without incurring idle time waiting for CPU 102. In some implementations, depending on the size of the command buffer and the complexity of a scene, CPU 102 may write commands and data sets for frames several frames ahead of a frame being rendered by GPU 114. Command buffer 128 may be of fixed size (e.g., 5 megabytes) and may be written and read in a wraparound fashion (e.g., after writing to the last location, CPU 102 may reset the "put" pointer to the first location).

In some implementations, execution of rendering commands by rendering module 120 and operation of scanout module 124 need not occur sequentially. For example, where pixel buffer 126 is double buffered as mentioned previously, rendering module 120 can freely overwrite the back buffer while scanout module 124 reads from the front buffer. Thus, rendering module 120 may read and process commands as they are received. Flipping of the back and front buffers can be synchronized with the end of a scanout frame as is known in the art. For example, when rendering module 120 has completed a new image in the back buffer, operation of rendering module 120 may be paused until the end of scanout for the current frame, at which point the buffers may be flipped. Various techniques for implementing such synchronization features are known in the art, and a detailed description is omitted as not being critical to understanding the present invention.

The system described above is illustrative, and variations and modifications are possible. A GPU may be implemented using any suitable technologies, e.g., as one or more integrated circuit devices. The GPU may be mounted on an expansion card, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, GPUs embodying the present invention may be incorporated into a variety of devices, including general purpose computer systems, video game consoles and other special purpose computer systems, DVD players, handheld devices such as mobile phones or personal digital assistants, and so on.

While a modern GPU such as the one described above may efficiently process images with remarkable speed, there continues to be a demand for ever higher graphics performance. By using multiple GPUs to distribute processing load, overall performance may be significantly improved. However, implementation of a system employing multiple GPUs relates to significant challenges. Of particular concern is the coordination of the operations performed by various GPUs. The present invention provides innovative techniques related to the timing of GPU operations relevant in a multiple GPU system.

BRIEF SUMMARY OF THE INVENTION

The present invention relates to method, apparatuses, and systems for processing an ordered sequence of images for display using a display device involving operating a plurality of graphics devices each capable of processing images by performing rendering operations to generate pixel data, including at least one first graphics device and at least one second graphics device, using the plurality of graphics devices to process the ordered sequence of images, wherein the at least one first graphics device processes certain ones of the ordered sequence of images, including a first image, and the at least one second graphics device processes certain other ones of the ordered sequence of images, including a second image, wherein the first image precedes the second image in the ordered sequence of images, delaying at least one operation of the at least one second graphics device to allow processing of the first image by the at least one first graphics device to advance relative to processing of the second image by the at least one second graphics device, in order to maintain sequentially correct output of the ordered sequence of images, and selectively providing output from the plurality of graphics devices to the display device, to display pixel data for the ordered sequence of images.

In one embodiment of the invention, the at least one operation is delayed while the at least one second graphics device awaits to receive a token from the at least one first graphics device. Specifically, the at least one second graphics device may be precluded from starting to output pixel data corresponding to the second image, until the at least one second graphics device receives the token from the at least one first graphics device. Each of the graphics devices may be a graphics processing unit (GPU). Further, the at least one first graphics device may be part of a first graphics device group comprising one or more graphics devices responsible for processing the first image, and the at least one second graphics device may be a part of a second graphics device group comprising one or more graphics devices responsible for processing the second image. Each of the first and second graphics device groups may be a GPU group In another embodiment of the invention, the at least one first graphics device receives a first sequence of commands for processing images, the at least one second graphics device receives a second sequence of commands for processing images, and the at least one second graphics device synchronizes its execution of the second sequence of commands with the at least one first graphics device's execution of the first sequence of commands. The at least one second graphics device, upon receiving a command in the second sequence of commands, may delay execution of the second sequence of commands until an indication is provided that the at least one first graphics device has received a corresponding command in the first sequence of commands. The command in the second sequence of commands and the corresponding command in the first sequence of commands may each relate to a flip operation to alternate buffers for writing pixel data and reading pixel data. Further, the first and second sequences of commands may correspond to commands for outputting pixel data.

In yet another embodiment of the invention, the at least one first graphics device receives a first sequence of commands for processing images, the at least one second graphics device receives a second sequence of commands for processing images, and a software routine synchronizes the at least one second graphics device's execution of the second sequence of commands with the at least one first graphics device's execution of the first sequence of commands. The software routine, in response to the at least one second graphics device receiving a command in the second sequence of commands, may cause the at least one second graphics device to delay execution of the second sequence of commands until an indication is provided that the at least one first graphics device has received a corresponding command in the first sequence of commands. The software routine may employ at least one semaphore to implement synchronization, wherein the semaphore is released upon the at least one first graphics device's execution of the corresponding command in the first sequence of commands, and the semaphore must be acquired to allow the at least one second graphics device to continue executing the second sequence of commands. The command in the second sequence of commands and the corresponding command in the first sequence of commands may each relates to a flip operation to alternate buffers for writing pixel data and reading pixel data. Further, the first and second sequences of commands may correspond to commands for performing rendering operations to generate pixel data.

BRIEF DESCRIPTION OF THE DRAWINGS

FIG. 8 presents a set of pseudo code for an interrupt service routine that uses a semaphore to selectively delay a GPU when necessary to keep the GPU's timing for processing images in lock step with that of other GPUs, in accordance with one embodiment of the invention;

FIG. 9 presents an alternative set of pseudo code for an interrupt service routine that uses a semaphore to selectively delay a GPU when necessary to keep the GPU's timing for processing images in lock step with that of other GPUs, in accordance with one embodiment of the invention.

DETAILED DESCRIPTION OF THE INVENTION

1. Multiple GPU Systems

Figure 1:
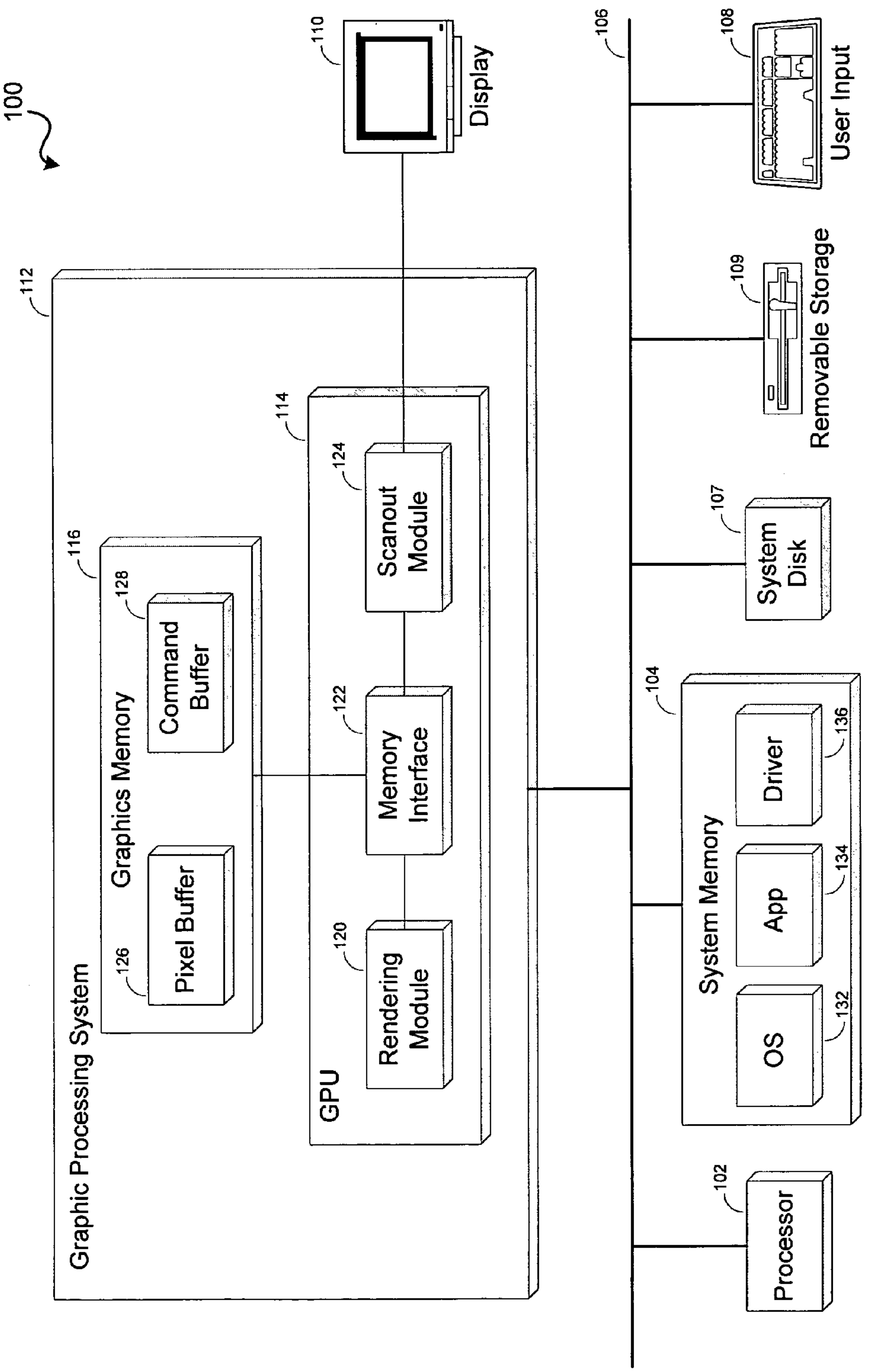
FIG. 1 is a block diagram of a computer system that includes a central processing unit (CPU) and a system memory communicating via a bus.
Figure 2:
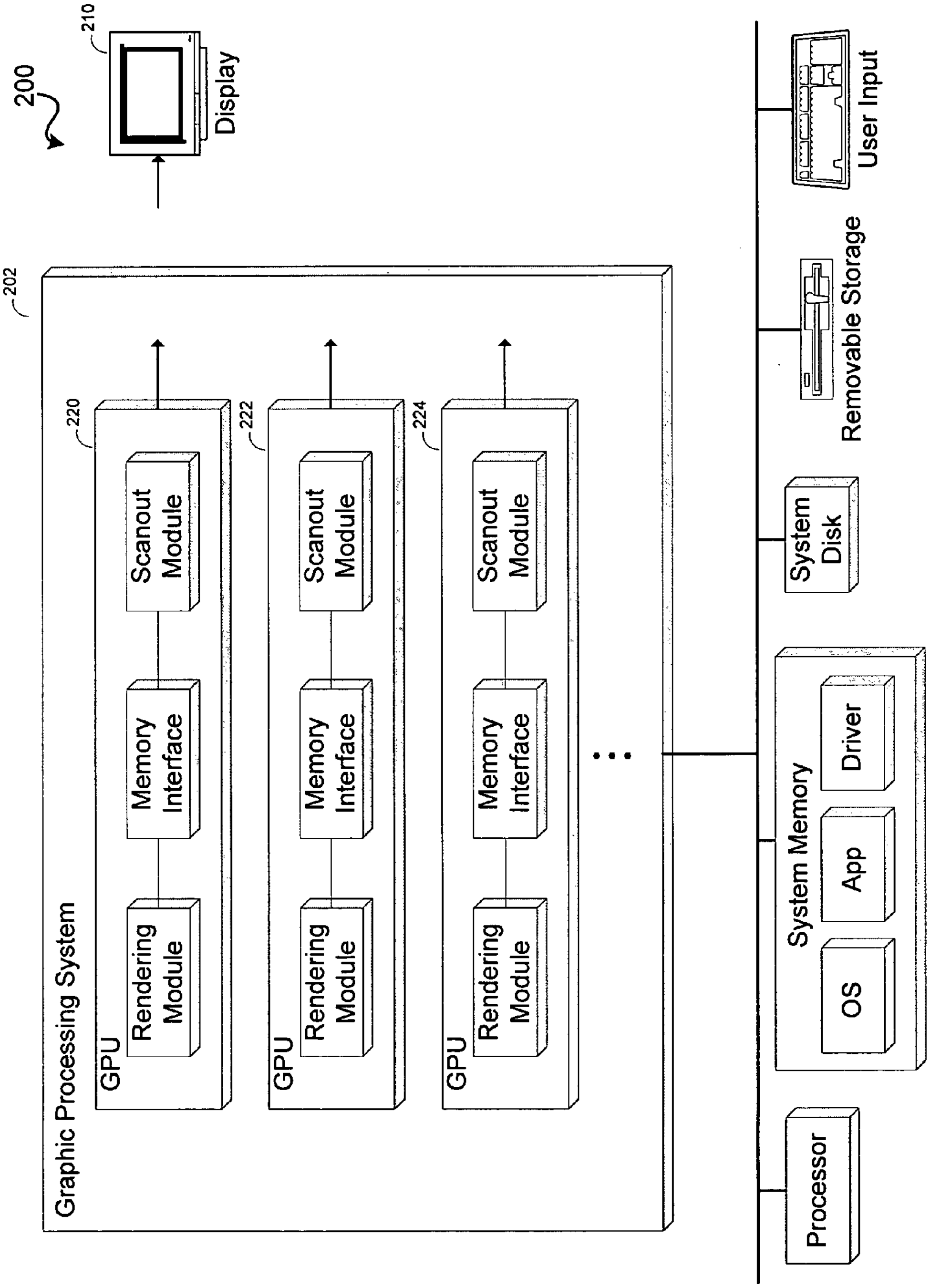
FIG. 2 is a block diagram of a computer system that employs multiple GPUs on a graphics processing subsystem according to one embodiment of the present invention.

FIG. 2 is a block diagram of a computer system 200 that employs multiple GPUs on a graphics processing subsystem according to one embodiment of the present invention. Like computer system 100 of FIG. 1, computer system 200 may include a CPU, system memory, system disk, removable storage, user input devices, and other components coupled to a system bus. Further, like computer system 100, computer system 200 utilizes a graphics processing subsystem 202 to produce pixel data representing visual output that is displayed using a display device 210. However, graphics processing subsystem 202 includes a plurality of GPUs, such as 220, 222, and 224. By utilizing more than one GPU, graphics processing subsystem 202 may effectively increase its graphics processing capabilities. In accordance with a technique that may be referred to as "alternate frame rendering" (AFR), for instance, graphics subsystem 202 may utilize the multiple GPUs to separately process images. For example, an ordered sequence of images comprising images 0, 1, 2, 3, 4, and 5 may be separately processed by GPUs 220, 222, and 224 as follows. GPU 220 processes image 0, then image 3. GPU 222 processes image 1, then image 4, and GPU 224 processes image 2, then 5. This particular manner of assigning images to GPUs is provided as a simple example. Other arrangement s are possible. Also, other ordered sequences of images may be of greater length.

FIG. 2 illustrates a simplified version of each of the GPUs 220, 222, and 224. Each of these GPUs may contain graphics memory (not shown) that includes a pixel buffer and a command buffer, as discussed previously with respect to GPU 114 shown in FIG. 1. As discussed, the pixel buffer may be doubled buffered by implementing a "front" buffer and a "back" buffer. To process an image, each GPU may utilizes a rendering module to perform rendering operations and write pixel data to the pixel buffer, as well as a scanout module to read and transfer pixel data from the pixel buffer to display device 210. Thus, GPU 220 may transfer out pixel data for image 0, followed by pixel data for image 3. GPU 222 may transfer out pixel data for image 1, followed by pixel data for image 4. GPU 224 may transfer out pixel data for image 2, followed by pixel data for image 5.

Figure 11:
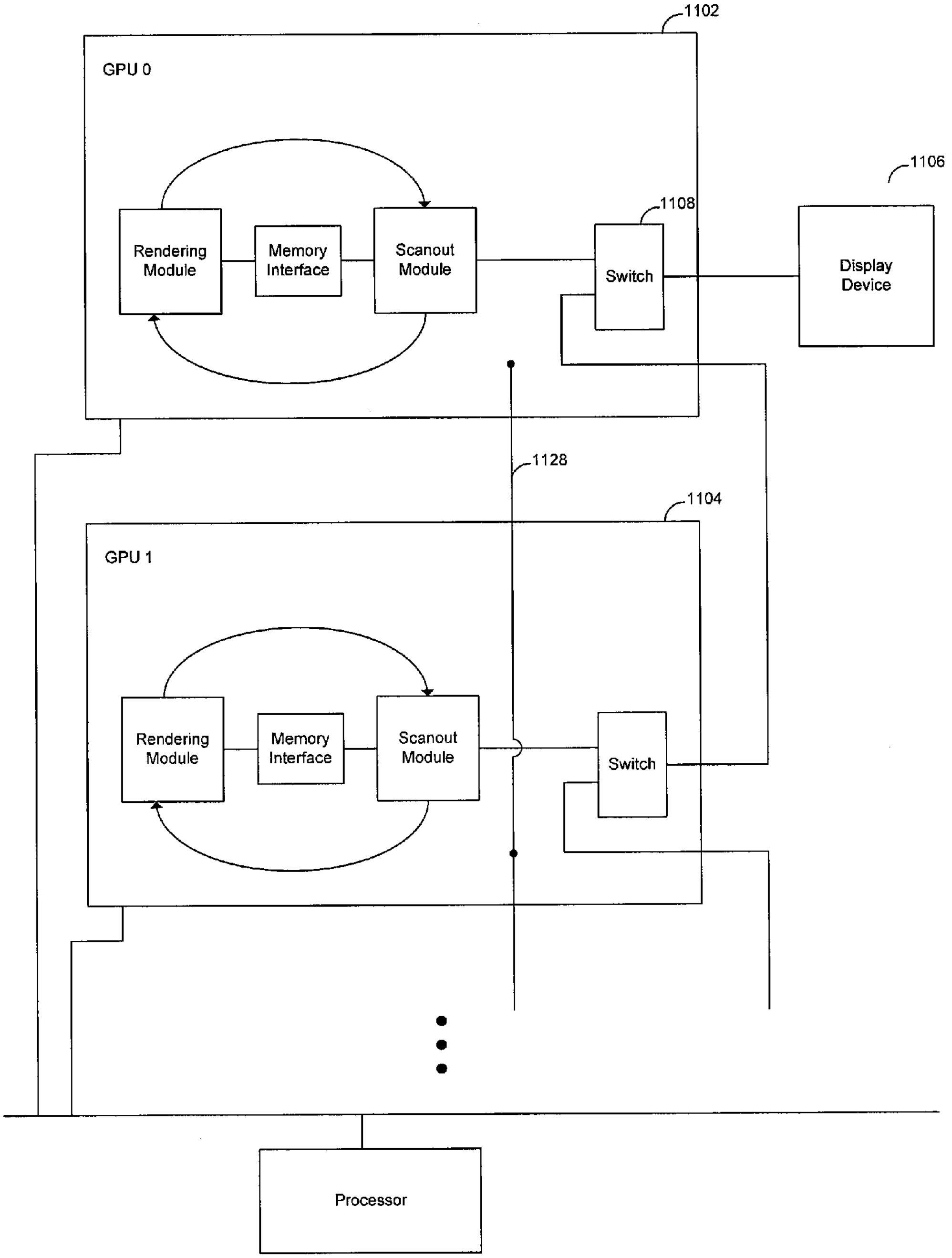
FIG. 11 is a block diagram of a system comprising multiple graphics processing units configured in a daisy chain configuration.

Appropriate circuitry may be implemented for selectively connecting the outputs of GPUs 220, 222, and 224 to display device 210, to facilitate the display of images 0 through 5. For example, an N-to-1 switch (not shown), e.g., N=3, may be built on graphics subsystem 202 to connect the outputs of GPU 220, 222, and 224 to display device 210. Alternatively, the GPUs may be arranged in a daisy-chain fashion (such as the configuration illustrated in FIG. 11), in which a first GPU 1102 is connected to display device 1106, and the rest of the GPUs (e.g., GPU 1104) are connected in a chain that begins with the first GPU 1102. In such an arrangement, each GPU may include an internal switching feature 1108 that can be controlled to switch between (1) outputting its own pixel data and (2) receiving and forwarding the pixel data of another GPU. By utilizing this internal switching feature 1108, pixel data from any one of the GPUs may be directed through the chain of GPUs to display device 1106. Details of such arrangements for systematically directing the outputs of multiple GPUs to a single display device are discussed in related U.S. application Ser. No. 10/990,712, titled "CONNECTING GRAPHICS ADAPTERS FOR SCALABLE PERFORMANCE", now U.S. Pat. No. 7,477,256 and U.S. patent application Ser. No. 11/012,394 titled "BROADCAST APERTURE REMAPPING FOR MULTIPLE GRAPHICS ADAPTERS", which are mentioned previously.

Figure 3:
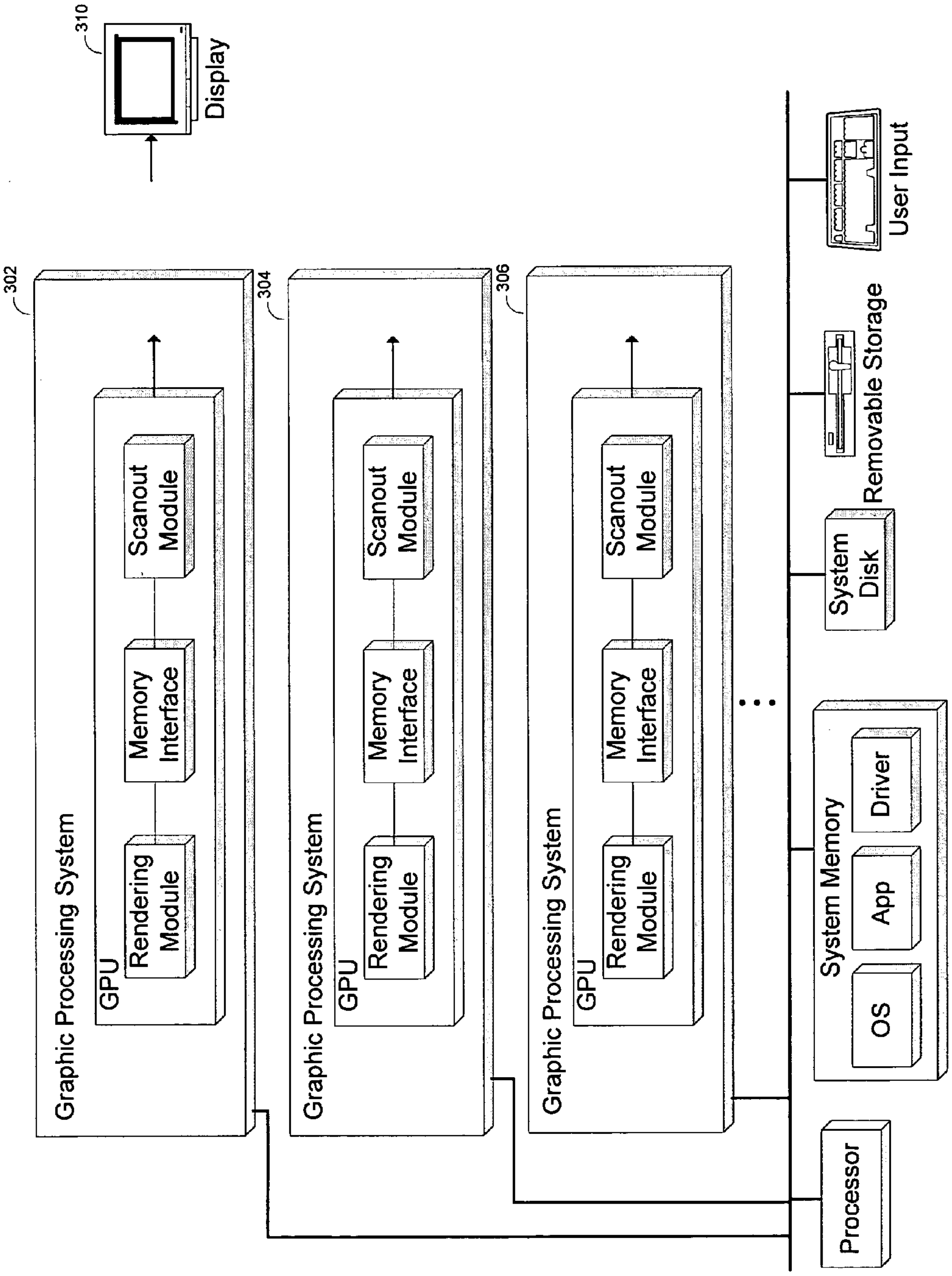
FIG. 3 is a block diagram of a computer system that employs multiple graphics processing subsystems each including at least one GPU according to an embodiment of the present invention.

FIG. 3 is a block diagram of a computer system 300 that employs multiple graphics processing subsystems each including at least one GPU according to an embodiment of the present invention. As shown in the figure, computer system 300 utilizes multiple graphics processing subsystems, such as 302, 304, and 306, to produce pixel data representing visual output that is displayed using a display device 310. Each of these graphics processing subsystems includes at least one GPU. Each GPU may operate in a manner similar to that described above. For example, each GPU may contain graphics memory (not shown) that includes a pixel buffer and a command buffer, and the pixel buffer may be doubled buffered by implementing a "front" buffer and a "back" buffer. Like computer system 200, computer system 300 utilizes multiple GPUs to effectively increase graphics processing power. However, in the case of computer system 300, the multiple GPUs may be implemented on separate graphics processing subsystems. Referring to the example of an ordered sequence of images comprising images 0, 1, 2, 3, 4, and 5, these images may be separately processed by GPUs on graphics processing subsystems 302, 304, and 306 as follows. A GPU on graphics subsystem 302 processes image 0 followed by image 3, a GPU on graphics subsystem 304 processes image 1 followed by image 4, and a GPU on graphics subsystem 306 processes image 2 followed by 5. Thus, graphics subsystems 302, 304, and 306 may separately transfer out pixel data for images 0 through 5, directed to display device 310. Appropriate circuitry may be implemented for selectively connecting outputs GPUs on graphics subsystem 302, 304, and 306 to display device 310. While FIG. 3 shows each of the multiple graphics processing subsystem as including only one GPU, it should be understood that each of the multiple graphics processing subsystem may include one or more GPUs according to various embodiments of the invention.

As shown in FIG. 2 and FIG. 3, multiple GPUs are utilized to separately process images to be presented on a display device. These GPUs may be implemented on a common graphics processing subsystem or distributed across different graphics processing subsystems. Though appropriate circuitry is implemented for selectively connecting outputs of the multiple GPUs to the display device, the timing of each GPU's output of pixel data for images, relatively to the timing of other GPUs' output of pixel data for other images, must still be controlled in some fashion. Otherwise, an ordered sequence of images, whose images have been separately processed by different GPUs, can potentially be displayed in a sequentially incorrect manner. A simple example is described below for purposes of illustration.

Figure 4A:
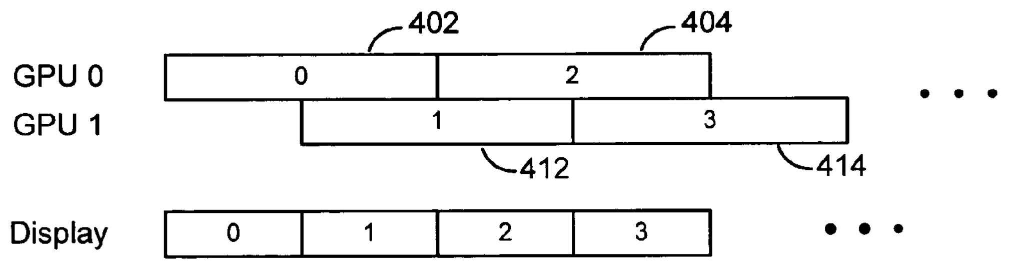
FIG. 4A depicts one scenario of the timing of two GPUs outputting pixel data corresponding to different images, resulting in sequentially correct output of an ordered sequence of images on a display device.

FIG. 4A depicts one scenario of the timing of two GPUs outputting pixel data corresponding to different images, resulting in sequentially correct output of an ordered sequence of images on a display device. An ordered sequence of images may include images 0, 1, 2, 3, 4, 5, . . . . Here, two GPUs, referred to as GPU 0 and GPU 1, are utilized to separately process the ordered sequence of images. GPU 0 processes images 0, 2, 4, . . . , and GPU 1 processes images 1, 3, 5, . . . , such that processing of the entire ordered sequence of images is distributed between the two GPUs. As described previously, a GPU may process a particular image by performing rendering operations to generate pixel data for the image and outputting the pixel data. When a GPU outputs pixel data corresponding to a particular image, a scanout module in the GPU may scan out frames of pixel data for the image at a prescribed refresh rate (e.g., 80 Hz). For example, in duration 402, GPU 0 may repeatedly output frames of pixel data corresponding to image 0 at the refresh rate. FIG. 4A shows durations 402 and 404, in which GPU 0 outputs pixel data for images 0 and 2, respectively. Also shown are durations 412 and 414, in which GPU 1 outputs pixel data for images 1 and 3, respectively.

In FIG. 4A, the timing of GPU 0's output and GPU 1's output remain well synchronized. GPU 0 outputs images 0, 2, . . . at a pace that is neither too fast nor too slow, relative to GPU 1's output of images 1, 3, . . . . By alternately connecting to the outputs of GPU 0 and GPU 1, a display device can present pixel data for the ordered sequence of images in a sequentially correct manner—image 0, image 1, image 2, image 3, and so on, as shown in the figure.

Figure 4B:
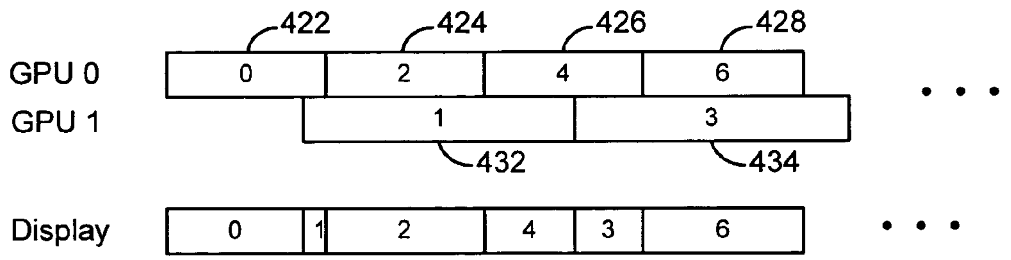
FIG. 4B depicts another scenario of the timing of two GPUs outputting pixel data corresponding to different images, resulting in sequentially incorrect output of an ordered sequence of images on a display device.

FIG. 4B depicts another scenario of the timing of two GPUs outputting pixel data corresponding to different images, resulting in sequentially incorrect output of an ordered sequence of images on a display device. FIG. 4B shows durations 422, 424, 426, and 428, in which GPU 0 outputs pixel data for images 0, 2, 4, and 6, respectively. Also shown are durations 432 and 434, in which GPU 1 outputs pixel data for images 1 and 3, respectively. Here, GPU 0 processes and outputs pixel data for images 0, 2, . . . at a pace that is faster than that of GPU 1 in processing and outputting pixel data for images 1, 3, . . . . Various reasons may contribute to such a phenomenon. For example, the content of images 0, 2, . . . may be less complex and thus require fewer and/or simpler rendering operations than images 1, 3, . . . , allowing GPU 0 to run faster than GPU 1. It may happen that at this particular point in time, GPU 1 encounters certain routine tasks to be performed, and GPU 0 does not, allowing GPU 0 to run faster than GPU 1. There may be many other reasons. The difference in pace between GPU 0 and GPU 1 may persist only momentarily, perhaps over the course of a few images. However, this can readily lead to the incorrect output of the ordered sequence of images.

In FIG. 4B, the output of images 0, 2, . . . by GPU 0 become misaligned with the output of images 1, 3, . . . by GPU 1. As a result, by alternately connecting to the outputs of GPU 0 and GPU 1, a display device can only present pixel data for the ordered sequence of images in a sequentially incorrect manner—image 0, image 1, image 4, image 3, image 6, and so on, as shown in the figure.

2. Token Passing

Figure 5:
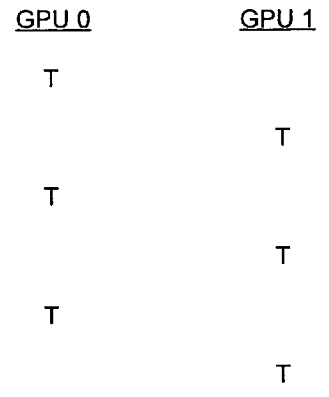
FIG. 5 illustrates the passing of a "token" between two GPUs to control the output of pixel data by the two GPUs such that an ordered sequence of images can be produced in a sequentially correct manner, according to one embodiment of the invention.

FIG. 5 illustrates the passing of a "token" between two GPUs to control the output of pixel data by the two GPUs such that an ordered sequence of images can be produced in a sequentially correct manner, according to one embodiment of the invention. The "token" may be implemented in a wide variety of ways. However implemented, the token is passed from one GPU to another such that at any point in time, only one GPU can be in possession of the token. For example, in a collection of GPUs, the token may be passed from one GPU to another in a round robin fashion. While FIG. 5 presents a simple case of two GPUs, it should be understood that a token may be passed amongst a greater number GPUs in accordance with various embodiments of the invention.

According to the present embodiment of the invention, possession of the token represents the opportunity for a GPU to begin outputting a new image. By passing the token back and forth, GPU 0 and GPU 1 take alternate turns at advancing through their respective sequence of images, in lock step. Referring back to FIG. 4B, at a particular moment, GPU 0 may begin outputting image 2 while possessing a token. Then, the token is passed to GPU 1. Since GPU 0 is operating at a pace faster than GPU 1, GPU 0 is soon ready to begin outputting image 4. However, GPU 1 possesses the token at this point in time, which precludes GPU 0 from prematurely beginning to output image 4. GPU 1's possession of the token ensures that GPU 1 can begin outputting image 3, before the token is be passed to GPU 0 to allow it to begin outputting image 4. Accordingly, use of a token in accordance with the present embodiment of the invention prevents the potential misalignment of the timing of GPU 0 and GPU 1 that can lead to output of an ordered sequence of images in a sequentially incorrect manner shown in FIG. 4B.

Thus, each time a GPU is ready to output pixel data for a new image, the GPU determines whether it is in possession of the token. If it is in possession of the token, the GPU begins outputting pixel data for the new image and passes the token to the next GPU. Otherwise, the GPU waits until it receives the token, then begins outputting pixel data for the new image and passes the token to the next GPU. In a GPU that implements double buffering, this may effectively delay a "flip" of the front and back buffers. In some implementations, for example, when the rendering module has completed a new image in the back buffer, operation of rendering module may be paused until the end of scanout of a frame of the current image, at which point the buffers may be flipped. By delaying scanout of the current image, the rendering module can thus be paused, effectively delaying the "flip" that is about to occur in the GPU.

According to one embodiment of the invention, a GPU preferably stops outputting pixel data for its current image whenever it receives a token. Thus, with each passing of the token, not only does the GPU that passes the token begin outputting pixel data for a new image, the GPU that receives the token stops outputting pixel data for its current image. This technique can be utilized to ensure that only one GPU is outputting pixel data at any particular point in time, which may a desirable feature depending on the specific details of the implementation.

In one implementation, status of the token may also be utilized in selectively connecting each GPU to the display device. For example, the GPUs may be arranged in a daisy-chain configuration, such as the configuration illustrated in FIG. 1, with a first GPU 1102 positioned at one end of the chain and connected to a display device 1106, as discussed previously. Each GPU in the chain may include an internal switching feature 1108 that can be controlled via signal 1128 to switch between (1) outputting its own pixel data and (2) receiving and forwarding the pixel data of another GPU. In this implementation, each GPU can determine whether it has passed the token, and thereby control its internal switch accordingly. For example, if the GPU passes the token, it may turn its internal switch to output its own pixel data. Otherwise, it may turn its internal switch to receive and forward the pixel data of another GPU. In this manner, each GPU in the daisy chain controls its internal switch appropriately, such that pixel data from the appropriate GPU may be automatically directed through the chain of GPUs to display device 1108.

According to the present embodiment of the invention, the token is implemented in hardware, by including a counter in each GPU. The counters in the GPUs uniformly maintain a count that is incremented through values that are assigned to the GPUs. For example, if there are three GPUs, the count may increment as 0, 1, 2, 0, 1, 2, . . . . Each GPU is assigned to one of the three values "0", "1", and "2." Thus, a count of "0" by the counters indicates that GPU 0 has the token. A count of "1" by the counters indicates that GPU 1 has the token. A count of "2" by the counters indicates that GPU 2 has the token. Each GPU can thus determine the location of the token by referring to its own counter. This embodiment presents one particular manner of implementing a token. There may be different ways to implement the token, as is known in the art.

Thus, by preventing the present GPU from starting to output pixel data for a current image until it receives a token from another GPU, the other GPU's processing of images is allowed to advance relative to the present GPU's processing of images. This permits the relative timing of multiple GPUs to be controlled such that sequentially correct output of the ordered sequence of images can be maintained.

According to one embodiment of the invention, a GPU preferably stops outputting pixel data for its current image whenever it receives a token. Thus, with each passing of the token, not only does the GPU that passes the token begin outputting pixel data for a new image, the GPU that receives the token stops outputting pixel data for its current image. This technique can be utilized to ensure that only one GPU is outputting pixel data at any particular point in time, which may a desirable feature depending on the specific details of the implementation.

According to yet another embodiment of the invention, a token may be passed from one GPU group to another GPU group to control timing of graphics processing for an ordered sequence of images. Here, each GPU group refers to a collection of one or more GPUs. GPUs from a GPU group may jointly process a single image. For example, in a mode that may be referred to as "split frame rendering," two or more GPUs may jointly process a single image by dividing the image into multiple portions. A first GPU may be responsible for processing one portion of the image (e.g., performing rendering operations and scanning out pixel data for that portion of the image), a second GPU may be responsible for processing another portion of the image, and so on. Details of techniques related to "split frame rendering" are discussed in related U.S. patent application Ser. No. 11/015,600, entitled "COHERENCE OF DISPLAYED IMAGES FOR SPLIT FRAME RENDERING IN A MULTI-PROCESSOR GRAPHICS SYSTEM,", as well as related U.S. patent application Ser. No. 10/642,905, entitled "ADAPTIVE LOAD BALANCING IN A MULTI-PROCESSOR GRAPHICS PROCESSING SYSTEM," both mentioned previously.

Thus, from an ordered sequence of images 0, 1, 2, 3, . . . , a first GPU group may jointly process image 0, then jointly process image 2, and so on, while a second GPU group may jointly process image 1, then jointly process image 3, and so on. A token may be used in a similar manner as discussed previously. However, instead of being passed from one GPU to another, the token is passed from one GPU group to another GPU group. For example, each time GPUs from a GPU group are ready to output pixel data for a new image, it is determined whether the GPU group is in possession of the token. If it is in possession of the token, the GPU group begins outputting pixel data for the new image and passes the token to the next GPU group. Otherwise, the GPU group waits until it receives the token, then begins outputting pixel data for the new image and passes the token to the next GPU group.

3. "Dummy Flip"

Figure 6:
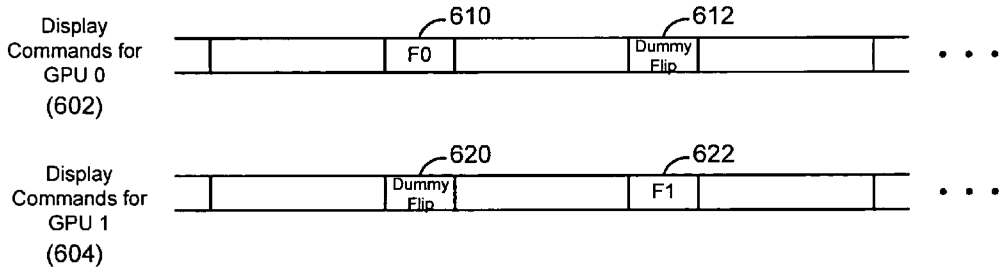
FIG. 6 shows the use of separate display command streams for two GPUs to control the output of pixel data by the two GPUs such that an ordered sequence of images can be produced in a sequentially correct manner, according to one embodiment of the invention.

FIG. 6 shows the use of separate display command streams for two GPUs to control the output of pixel data by the two GPUs such that an ordered sequence of images can be produced in a sequentially correct manner, according to one embodiment of the invention. In the present embodiment of the invention, GPU 0 and GPU 1 each contains a rendering module that receives commands from a rendering command stream and a scanout module that receives commands from a display command stream. Further, GPU 0 and GPU 1 each implements double buffering such that its rendering module can write to the back buffer while its scanout module can read from the front buffer, and a "flip" of the front and back buffers can begin the processing of a new image.

Referring to FIG. 6, display command streams 602 is received by the scanout module of GPU 0, and display command stream 604 is received by the scanout module of GPU 1. Here, GPU 0 and GPU 1 are used to process an ordered sequence of images 0, 1, 2, 3, . . . , with GPU 0 processing images 0, 2, . . . , and GPU 1 processing images 1, 3, . . . . Display command stream 602 for GPU 0 includes an "F0" flip command 610 that instructs GPU 0 to begin reading and scanning out pixel data for image 0 from its front buffer. Display command stream 602 also contains a command referred to here as a "dummy flip" 612. Dummy flip 602 does not relate to the display of the next image (image 2 in this case) to be processed by GPU 0. Rather, it relates to the display of image 1, which is not processed by GPU 0. Specifically, it may correspond to an "F1" flip command 622 in display command stream 604 for GPU 1. Thus, display command stream 602 may contain a flip command for image 0, followed by a dummy flip command for image 1, followed by a flip command for image 2, followed by a dummy flip command for image 3, and so on. By including dummy flips such as 612, display command stream 602 provides the scanout module of GPU 0 with information regarding the order of other images relative to images 0, 2, . . . , which GPU 0 is to process.

Similarly, display command stream 604 for GPU 1 includes not only flip commands for images that GPU 1 is to process, but also dummy flip commands relating to images to be processed by GPU 0. For example, display command stream 604 includes the "F1" flip command 620. In addition, it also includes dummy flip 620, which corresponds to the "F0" flip command 610 in display command stream 602 for GPU 0. Thus, display command stream 604 may contain a dummy flip command for image 0, followed by a flip command for image 1, followed by a dummy flip command for image 2, followed by a flip command for image 3, and so on. Again, by including dummy flips such as 620, display command stream 604 provides the scanout module of GPU 1 with information regarding the order of other images relative to images 1, 3, . . . , which GPU 1 is to process.

Upon receiving a flip command in the display command stream, a GPU's rendering module may begin display operations related to a "flip," such as reading pixel data for a new image from the front buffer. By contrast, upon receiving a dummy flip command, the rendering module may not perform normal display operations related to a "flip." Instead, the rendering module receiving the dummy flip may enter a stall mode to wait for some indication that a corresponding real flip command has been executed by a rendering module in another GPU, in order to control timing of the GPU relative to that of the other GPU. For example, the scanout module for GPU 0, upon receiving the "F0" flip command 610 for image 0, may begin reading pixel data for image 0 from the front buffer. However, upon receiving dummy flip command 612 for image 1, the scanout module may stop executing further commands from display command stream 602, until an indication is provided that the corresponding "F1" real flip command for image 1 has been executed in GPU 1.

According to the present embodiment of the invention, this indication is provided by a special hardware signal that indicates whether all of the relevant GPUs have reached execution of their respective flip command, or dummy flip command, for a particular image. Effectively, this special hardware signal represents the output of an AND function, with each input controlled by one of the GPUs based on whether the GPU has reached the real flip command or dummy flip command for an image. For example, referring to FIG. 6, GPU 0 will assert its input when it reaches flip command 610 for image 0. GPU 1 will assert its input when it reaches dummy flip command 620 for image 0. Only when both inputs are asserted will the special hardware signal be asserted, indicating all GPUs have reached their respective execution of flip commands or dummy flip commands for image 0. Similarly, for the next image, GPU 0 will assert its input when it reaches dummy flip command 612 for image 1, and GPU 1 will assert its input when it reaches flip command 622. Only when both inputs are asserted will the special hardware signal be asserted, indicating all GPUs have reached their respective execution of flip commands or dummy flip commands for image 1. The hardware signal may be implemented in various ways. For example, each GPU may have an open-drain port coupled to the hardware signal, and only when all of the GPUs drive their open-drain ports to logic "1" will the hardware signal indicate a logic "1." Otherwise, if any of the GPUs drives its open-drain port to logic "0," the hardware signal indicates a logic "0."

Accordingly, each GPU may then utilize its display command stream, which includes real flip commands and dummy flip commands, to identify the proper sequence of images to be displayed and control the timing of its scanout module with respect to the timing of other GPU(s). In other embodiments, commands used for providing image sequence information, such as dummy flip commands, may be provided in rendering command streams received and executed by each GPU. While FIG. 6 presents a simple case of two GPUs, it should be understood that timing of the output of a greater number of GPUs may be controlled as described above in accordance with various embodiments of the invention.

4. Semaphore Release and Acquisition

Figure 7:
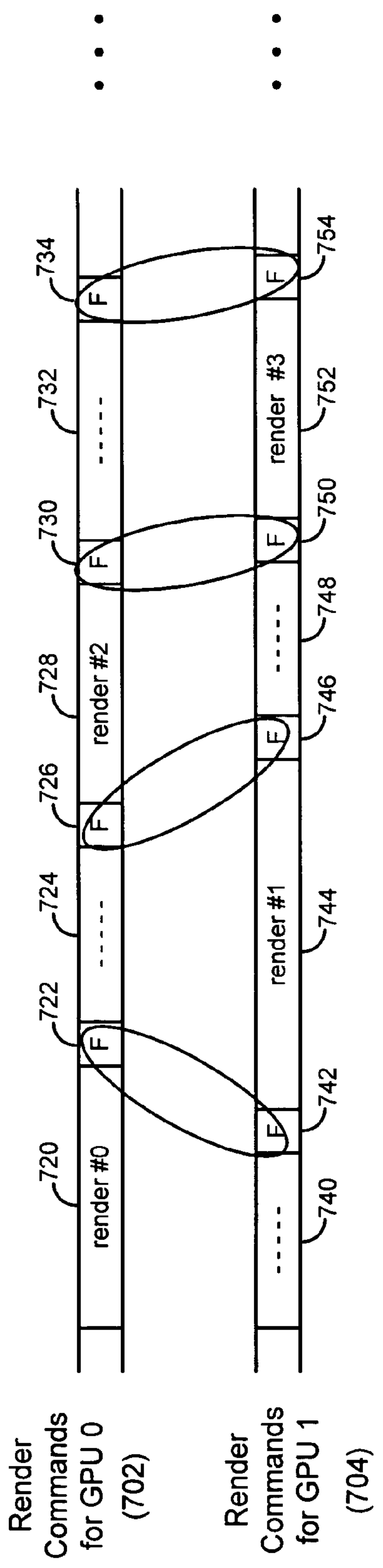
FIG. 7 shows rendering command streams for two GPUs whose timing are controlled through software such that the two GPUs can produce an ordered sequence of images in a sequentially correct manner, according to one embodiment of the invention.

FIG. 7 shows rendering command streams for two GPUs whose timing are controlled through software such that the two GPUs can produce an ordered sequence of images in a sequentially correct manner, according to one embodiment of the invention. Here, GPU 0 and GPU 1 each contains a rendering module that receives commands from a rendering command stream and a scanout module that operates in conjunction with the rendering command. The scanout module does not receive a separate a display command stream. Instead, the scanout module automatically reads and outputs pixel data for each image generated by the rendering module. However, in other embodiments, the scanout module may receive a separate display command stream. Further, GPU 0 and GPU 1 each implements double buffering such that its rendering module can write to the back buffer while its scanout module can read from the front buffer, and a "flip" of the front and back buffers can begin the processing of a new image.

Referring to FIG. 7, render command stream 702 is received by the rendering module of GPU 0, and render command stream 704 is received by the rendering module of GPU. Again, a simple example is presented in which GPU 0 and GPU 1 are used to process an ordered sequence of images 0, 1, 2, 3, . . . , with GPU 0 processing images 0, 2, . . . , and GPU 1 processing images 1, 3, . . . . Render command stream 702 for GPU 0 includes rendering commands 720 for image 0, followed by a flip command 722, followed by additional commands 724, followed by a flip command 726, followed by rendering commands 728 for image 2, followed by a flip command 730, followed by additional commands 732, followed by a flip command 734, and so on. The additional commands 724 and 732, labeled as "-----" in render command stream 702, may comprise rendering commands for images 1, 3, . . . , and so on. In one embodiment of the invention, these additional commands are ignored by the rendering module of GPU 0.

Render command stream 704 for GPU 1 includes additional commands 740, followed by a flip command 742, followed by rendering commands 744 for image 1, followed by a flip command 746, followed by additional commands 748, followed by a flip command 750, followed by rendering commands 752 for image 3, followed by a flip command 754, and so on. The additional commands 740 and 748, labeled as "-----" in render command stream 704, may comprise rendering commands for images 0, 2, . . . , and so on. In one embodiment of the invention, these additional commands are ignored by the rendering module of GPU 1.

According to the present embodiment of the invention, software such as driver software executed on a CPU controls the timing of the operations of GPU 0 and GPU 1, such that GPU 0's processing of images 0, 2, . . . is kept in lock step with GPU 1's processing of images 1, 3, . . . , and vice versa. Specifically, each time a rendering module of a GPU encounters a flip command, such as those shown in FIG. 7, the GPU generates an interrupt. The interrupt is serviced by an interrupt service routine provided by the software. The interrupt service routine keeps track of the progression of each GPU in its processing of images and may selectively delay a GPU when necessary to synchronize the GPU's timing for processing images with that of other GPUs.

FIG. 8 presents a set of pseudo code for an interrupt service routine that uses a semaphore to selectively delay a GPU when necessary to keep the GPU's timing for processing images in lock step with that of other GPUs, in accordance with one embodiment of the invention. A semaphore generally refers to a software construct that allows multiple processes to compete for the same resource. Once a semaphore is acquired by one process, the semaphore must be released by the process before it can be acquired by another process. Thus, a GPU that is be ready to process a subsequent image too quickly, with respect to the timing of another GPU, may be effectively delayed while waiting for a semaphore to be released in connection with the processing of the other GPU.

As shown in FIG. 8, each time a GPU encounters a flip command, the GPU generates an interrupt that calls the interrupt service routine "flip( )." A parameter is passed to the routine to identify the GPU, i.e., GPU (i), that encountered the flip command and generated the interrupt. Using an array GPUState[i], the routine keeps track of whether each GPU is considered "active" or "inactive." An "active" status indicates that the current flip command represents a real flip operation that the GPU is to perform. An "inactive" status indicates that the current flip command represents a flip operation that the GPU is not to perform, one that corresponds to a real flip operation in another GPU. Using an array FrameNumber [i], the routine also keeps track of, for each GPU, which image in the ordered sequence of images corresponds to the current flip command encountered by the GPU.

For example, referring back to FIG. 7, when GPU 1 encounters flip command 742, an interrupt is generated by GPU 1, and flip( ) is called to service the interrupt. Here, GPU 1's current image is image 1, as indicated by FrameNumber [1]=1. GPU 1 is in the active state, as indicated by GPUState [1]=ACTIVE. This means GPU 1 is responsible for processing the current image, image 1. Before allowing GPU 1 to proceed with such processing, flip( ) attempts to acquire the semaphore for image 1, using the function Semaphore.Acquire( ). Here, the semaphore for image 1 has not yet been released with respect to the processing of GPU 0, and the function Semaphore.Acquire( ) simply does not return until the semaphore is acquired. Thus, flip( ) hangs until the semaphore for image 1 is acquired. Only then is the function GPU(i).Display(NewBuffer) called, which instructs GPU 1 to proceed with the processing of image 1. Thereafter, the state of GPU 1 is toggled to the inactive state in preparation for the next image. Finally, GPU 1's current image is incremented in preparation for the next image.

Meanwhile, when GPU 0 encounters flip command 722, an interrupt is generated by GPU 0, and flip( ) is called to service the interrupt. Here, GPU 0's current image is also image 1, as indicated by FrameNumber[0]=1. GPU 0 is in the inactive state, as indicated by GPUState[0]=INACTIVE. This means GPU 0 is not responsible for processing the current image, image 1. Thus, flip( ) does not call any functions for GPU 0 to process image 1. Flip( ) simply releases the semaphore for image 1, making it free to acquired. When this occurs, the call to Semaphore.Acquire( ) mentioned above with respect to GPU 1 may acquire the semaphore for image 1 and allow GPU 1 to proceed with the processing of image 1. Thereafter, the state of GPU 0 is toggled to the active state in preparation for the next image. Finally, GPU 0's current image is incremented in preparation for the next image.

In this manner, flip command 742 may delay GPU 1's processing of image 1, until corresponding flip command 722 is encountered by GPU 0. Similarly, flip command 726 may delay GPU 0's processing of image 2, until corresponding flip command 746 is encountered by GPU 1. Also, flip command 750 may delay GPU 1's processing of image 3, until corresponding flip command 730 is encountered by GPU 0. This process thus keeps the operation of GPU 0 in lock step with the operation of GPU 1, and vice versa, by selectively delaying each GPU when necessary. Here, interrupt service routine "flip( )" may be halted while delaying the processing of a GPU. In such a case, the interrupt service routine may be allocated to a thread of a multi-threaded process executed in the CPU, so that the halting of the interrupt service routine does not create a blocking call that suspends other operations of the CPU. In certain implementations, however, allocating the interrupt service routine to another thread for this purpose may not be practicable. An alternative implementation is described below that does not require the use of such a separate thread of execution.

FIG. 9 presents an alternative set of pseudo code for an interrupt service routine that uses a semaphore to selectively delay a GPU when necessary to keep the GPU's timing for processing images in lock step with that of other GPUs, in accordance with one embodiment of the invention. The pseudo code in FIG. 9 achieves similar functions as the pseudo code in FIG. 8, without create a blocking function call. That is, the interrupt service routine "flip( )" shown in FIG. 9 does not hang while waiting for a function such as Semaphore.Acquire( ) to return. In this implementation, flip( ) can selectively place a GPU in a stall mode, by controlling an array Unstall[i]. The semaphore is implemented using various status arrays. These include an array SemaphoreAcquiring[i] to indicate whether each GPU is attempting to acquire a semaphore, as well as an array SemaphoreAcquiringValue [i] to indicate the image for which each GPU is attempting to acquire a semaphore, if it is attempting to do so.

When a flip encountered by a GPU is in the "active" state, flip( ) determines whether the semaphore for the current image has been acquired. If so, GPU is taken out of stall mode, SemaphoreAcquiring[i] is set to FALSE in preparation for the next image, and GPU(i).Display(NewBuffer) is called to instruct the GPU to proceed with the processing of the current image. If not, SemaphoreAcquiring[i] is set to TRUE, and SemaphoreAquiringValue[i] is set to the current image, to indicate that the GPU is now attempting to acquire the semaphore for the current image.

When a flip encountered by a GPU is in the "inactive" state, flip( ) releases the semaphore for the current image by updating the variable "Semaphore" to the current image number, as represented by FrameNumber[i]. Then flip( ) determines whether the other GPU is attempting to acquire a semaphore and whether the other GPU is attempting to acquire a semaphore for the current image. If both conditions are true, this indicates that the other GPU is still attempting to acquire the semaphore that the present GPU is releasing. Thus, if both conditions are true, flip( ) performs operations that it was not able to perform previously for the other GPU when it was unable to acquire the semaphore for the current image. Namely, the other GPU is taken out of stall mode, SemaphoreAcquiring[i] is set to FALSE for the other GPU in preparation for the next image, and GPU(i).Display(NewBuffer) is called to instruct the other GPU to proceed with the processing of the current image.

Note that the "other" GPU is represented by the index "(1−i)." This is applicable to the two GPU case, such that if the current GPU is represented by GPU (i=0), the other GPU is represented by GPU(1−i), or GPU (1). Conversely, if the current GPU is represented by GUP (i=1), the other GPU is represented by GPU (1−i), or GPU (0). The code in FIG. 9 can certainly be extended to be applicable to cases involving more than two GPUs, as would be apparent to one of skill in the art.

The flip( ) routine shown in FIG. 9 can thus selectively delay operations of each GPU to control the relative timing of multiple GPUs. Again, referring to FIG. 7, flip command 742 may delay GPU 1's processing of image 1, until corresponding flip command 722 is encountered by GPU 0. Similarly, flip command 726 may delay GPU 0's processing of image 2, until corresponding flip command 746 is encountered by GPU 1. Also, flip command 750 may delay GPU 1's processing of image 3, until corresponding flip command 730 is encountered by GPU 0. This process thus keeps the operation of GPU 0 in lock step with the operation of GPU 1, and vice versa, by selectively delaying each GPU.

Figure 10:
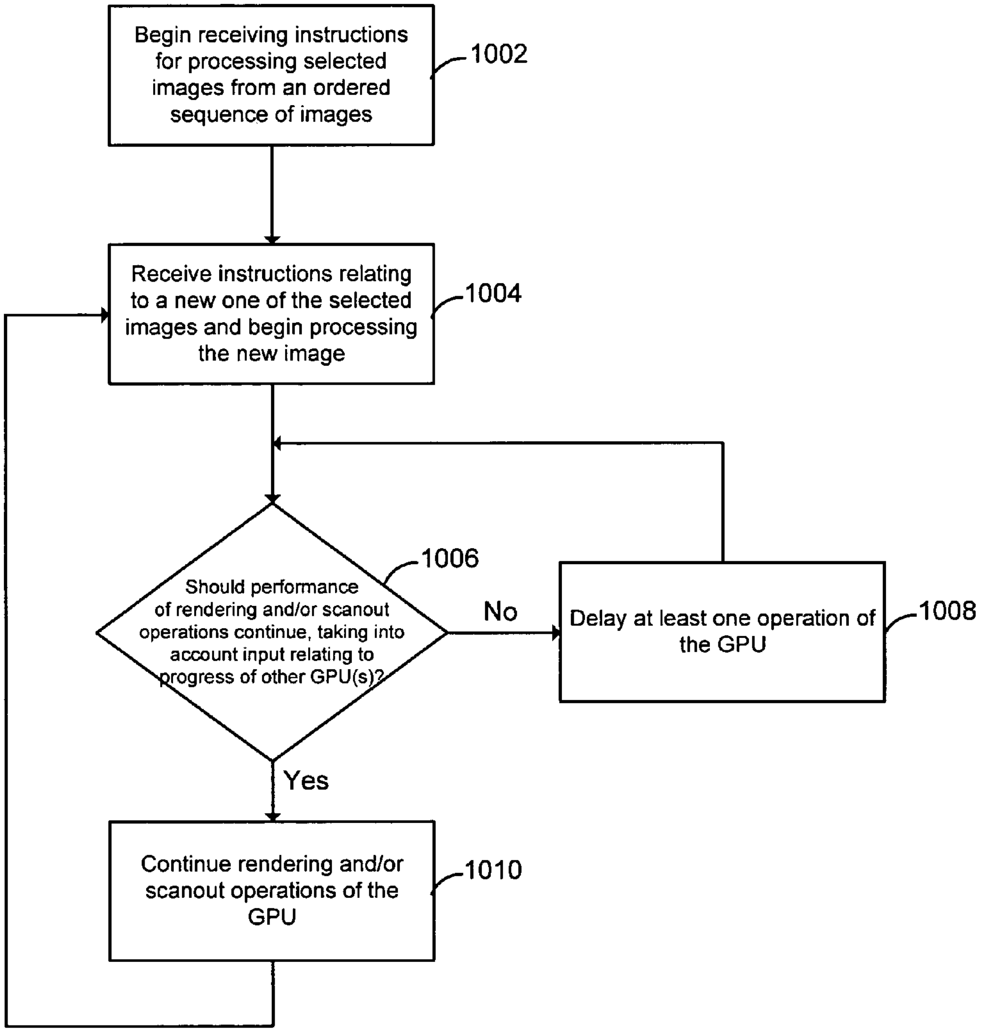
FIG. 10 is a flow chart outlining representative steps performed for synchronizing the timing of a GPU with that of other GPU(s), according to an embodiment of the invention.

FIG. 10 is a flow chart outlining representative steps performed for synchronizing the timing of a GPU with that of other GPU(s), according to an embodiment of the invention.

In a step 1002, the GPU begins receiving instructions for processing selected images from an ordered sequence of images. In a two-GPU case, the selected images may be the even images (or the odd images) from the ordered sequence of images. The instructions may originate from a CPU executing a driver program and may be sent to the GPU via one or more command streams. The instructions may include rendering commands and/or scanout commands. In a step 1004, the GPU receives instructions relating to the processing of a new image from amongst the selected images and begins processing the new image according to received instructions. Such processing may include rendering operations and/or scanout operations.

In a step 1006, a determination is made as to whether the GPU should continue to perform rendering and/or scanout operations, by taking into account input relating to the progress of other GPU(s). In one embodiment, this input takes the form of a token that is passed to the present GPU from another GPU, indicating that the present GPU may begin scanout operations for a new image. In another embodiment, this input takes the form of a hardware signal corresponding to a "dummy flip" received in the command stream(s) of the present GPU, indicating that other GPU(s) have reached a certain point in their processing of images. In yet another embodiment, the input takes the form of an acquired semaphore implemented in software that indicates other GPU(s) have reached a certain point in the processing of images, such that the current GPU may proceed with its operations.

If the determination in step 1006 produces a negative result, the process advances to step 1008, in which at least one operation of the GPU is delayed. For example, the operation that is delayed may include reading of a rendering command, execution of a rendering operation, reading of a scanout command, execution of a scanout operation, and/or other tasks performed by the GPU. By delaying an operation of the GPU, the overall timing of the GPU in its processing of success images may be shifted, so that other GPU(s) processing other images from the ordered sequence of images may be allowed to catch up with the timing of the present GPU. If the determination step 1006 produces a positive result, the process advances to step 1010, in which operations of the GPU such as rendering and/or scanout operations are continued. Thereafter, the process proceeds back to step 1004.

The representative steps in FIG. 10 are presented for illustrative purposes. Substitutions and variations can be made in accordance with the invention. Just as an example, step 1004 may be moved to a position after step 1006 and before step 1010. In such a case, the GPU may make the determination shown in 1006 prior to step 1004. Thus, the GPU may delay its operations in step 1008, such that the GPU does not receive instructions for processing a new image or process the new image until the determination in step 1006 results in a positive outcome.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for processing an ordered sequence of images for display using a display device comprising:

operating a plurality of graphics devices each capable of processing images by performing rendering operations to generate pixel data, including at least one first graphics device and at least one second graphics device, each graphics device including an internal switching feature configurable to select between outputting pixel data generated by the graphics device and receiving and forwarding pixel data of another graphics device;

using the plurality of graphics devices to process the ordered sequence of images, wherein the at least one first graphics device processes certain ones of the ordered sequence of images, including a first image, and the at least one second graphics device processes certain other ones of the ordered sequence of images, including a second image, wherein the first image precedes the second image in the ordered sequence of images, wherein the at least one first graphics device is part of a first graphics device group responsible for processing the first image, wherein each graphics device in the first graphics device group processes at least a portion of the first image, and the at least one second graphics device is a part of a second graphics device group responsible for processing the second image, wherein each graphics device in the second graphics device group processes at least a portion of the second image, and wherein at least one of the first graphics device group or the second graphics device group includes more than one graphics device;

delaying an operation of the second graphics device group to allow processing of the first image by the first graphics device group to advance relative to processing of the second image by the second graphics device group, in order to maintain sequentially correct output of the ordered sequence of images; and selectively providing output from the plurality of graphics devices to the display device, to display pixel data for the ordered sequence of images, wherein the plurality of graphics devices are arranged in a daisy chain configuration wherein pixel data from each of plurality of pixel devices is directed to the display device along the daisy chain configuration via the internal switching feature included in the plurality of graphics devices.

2. The method of claim 1 wherein the operation is delayed while the at least one second graphics device awaits to receive a token from the at least one first graphics device.

3. The method of claim 2 wherein the at least one second graphics device is precluded from starting to output pixel data corresponding to the second image, until the at least one second graphics device receives the token from the at least one first graphics device.

4. The method of claim 2 wherein passing of the token is implemented by incrementing a count through various predefined values, including a first predefined value representing possession of the token by the at least one first graphics device and a second predefined value representing possession of the token by the at least one second graphics device.

5. The method of claim 4 wherein each of the graphics devices operates a counter to maintain a version of the count.

6. The method of claim 1 wherein each of the plurality of graphics devices is a graphics processing unit (GPU).

7. The method of claim 1 wherein the operation is delayed while the second graphics device group awaits to receive a token from the first graphics device group.

8. The method of claim 1 wherein each of the first and second graphics device groups is a GPU group.

9. The method of claim 1, wherein the at least one first graphics device receives a first sequence of commands for processing images, and the at least one second graphics device receives a second sequence of commands for processing images; and wherein the at least one second graphics device synchronizes its execution of the second sequence of commands with the at least one first graphics device's execution of the first sequence of commands.

10. The method of claim 9 wherein the at least one second graphics device, upon receiving a command in the second sequence of commands, delays execution of the second sequence of commands until an indication is provided that the at least one first graphics device has received a corresponding command in the first sequence of commands.

11. The method of claim 10, wherein the indication is provided as a hardware signal received by the at least one second graphics device.

12. The method of claim 9 wherein the command in the second sequence of commands and the corresponding command in the first sequence of commands each relates to a flip operation to alternate buffers for writing pixel data and reading pixel data.

13. The method of claim 9 wherein the first and second sequences of commands correspond to commands for outputting pixel data.

14. The method of claim 1, wherein the at least one first graphics device receives a first sequence of commands for processing images, and the at least one second graphics device receives a second sequence of commands for processing images; and wherein a software routine synchronizes the at least one second graphics device's execution of the second sequence of commands with the at least one first graphics device's execution of the first sequence of commands.

15. The method of claim 14 wherein the software routine, in response to the at least one second graphics device receiving a command in the second sequence of commands, causes the at least one second graphics device to delay execution of the second sequence of commands until an indication is provided that the at least one first graphics device has received a corresponding command in the first sequence of commands.

16. The method of claim 15 wherein the software routine employs a semaphore to implement synchronization, wherein the semaphore is released upon the at least one first graphics device's execution of the corresponding command in the first sequence of commands, and the semaphore must be acquired to allow the at least one second graphics device to continue executing the second sequence of commands.

17. The method of claim 15, wherein the indication is provided as an interrupt to the software routine.

18. The method of claim 14 wherein the command in the second sequence of commands and the corresponding command in the first sequence of commands each relates to a flip operation to alternate buffers for writing pixel data and reading pixel data.

19. The method of claim 14 wherein the first and second sequences of commands correspond to commands for performing rendering operations to generate pixel data.

20. An apparatus for processing an ordered sequence of images for display using a display device comprising:

a plurality of graphics devices each capable of processing images by performing rendering operations to generate pixel data, including at least one first graphics device and at least one second graphics device, each graphics device including an internal switching feature configurable to select between outputting pixel data generated by the graphics device and receiving and forwarding pixel data of another graphics device;

wherein the at least one first graphics device is capable of processing certain ones of the ordered sequence of images, including a first image, and the at least one second graphics device is capable of processing certain other ones of the ordered sequence of images, including a second image, the first image preceding the second image in the ordered sequence of images;

wherein the at least one first graphics device is part of a first graphics device group responsible for processing the first image, wherein each graphics device in the first graphics device group processes at least a portion of the first image, and the at least one second graphics device is a part of a second graphics device group responsible for processing the second image, wherein each graphics device in the second graphics device group processes at least a portion of the second image, and wherein at least one of the first graphics device group or the second graphics device group includes more than one graphics device;

wherein an operation of the second graphics device group is capable of being delayed to allow processing of the first image by the first graphics device group to advance relative to processing of the second image by the second graphics device group, in order to maintain sequentially correct output of the ordered sequence of images; and wherein one of the plurality of graphics devices is configured selectively provide output from the plurality of graphics devices, to display pixel data for the ordered sequence of images, wherein the plurality of graphics devices are arranged in a daisy chain configuration, and wherein pixel data from each of plurality of pixel devices is directed to the display device along the daisy chain configuration via the internal switching feature included in the plurality of graphics devices.

21. A system for processing an ordered sequence of images for display using a display device comprising:

means for operating a plurality of graphics devices each capable of processing images by performing rendering operations to generate pixel data, including at least one first graphics device and at least one second graphics device, each graphics device including an internal switching feature configurable to select between outputting pixel data generated by the graphics device and receiving and forwarding pixel data of another graphics device;

means for using the plurality of graphics devices to process the ordered sequence of images, wherein the at least one first graphics device processes certain ones of the ordered sequence of images, including a first image, and the at least one second graphics device processes certain other ones of the ordered sequence of images, including a second image, wherein the first image precedes the second image in the ordered sequence of images, wherein the at least one first graphics device is part of a first graphics device group responsible for processing the first image, wherein each graphics device in the first graphics device group processes at least a portion of the first image, and the at least one second graphics device is a part of a second graphics device group responsible for processing the second image, wherein each graphics device in the second graphics device group processes at least a portion of the second image, and wherein at least one of the first graphics device group or the second graphics device group includes more than one graphics device;

means for delaying an operation of the second graphics device group to allow processing of the first image by first graphics device group to advance relative to processing of the second image by second graphics device group, in order to maintain sequentially correct output of the ordered sequence of images; and means for selectively providing output from the plurality of graphics devices, to display pixel data for the ordered sequence of images, wherein the plurality of graphics devices are arranged in a daisy chain configuration wherein pixel data from each of plurality of pixel devices is directed to the display device along the daisy chain configuration via the internal switching feature included in the plurality of graphics devices.

* * * * *